US012652104B2

(12) United States Patent
Ugajin

(10) Patent No.: US 12,652,104 B2
(45) Date of Patent: Jun. 9, 2026

(54) TRANSMISSION APPARATUS, TRANSMISSION METHOD, AND RECORDING MEDIUM OF TRANSMISSION PROGRAM

(71) Applicant: NEC Corporation, Tokyo (JP)

(72) Inventor: Kazusa Ugajin, Tokyo (JP)

(73) Assignee: NEC CORPORATION, Tokyo (JP)

( * ) Notice: Subject to any disclaimer, the term of this patent is extended or adjusted under 35 U.S.C. 154(b) by 413 days.

(21) Appl. No.: 18/267,312

(22) PCT Filed: Dec. 16, 2021

(86) PCT No.: PCT/JP2021/046476
§ 371 (c)(1),
(2) Date: Jun. 14, 2023

(87) PCT Pub. No.: WO2022/138431
PCT Pub. Date: Jun. 30, 2022

(65) Prior Publication Data
US 2024/0048236 A1    Feb. 8, 2024

(30) Foreign Application Priority Data
Dec. 21, 2020    (JP) ................................. 2020-210946

(51) Int. Cl.
*H04B 10/077*        (2013.01)
(52) U.S. Cl.
CPC .................................. *H04B 10/077* (2013.01)
(58) Field of Classification Search
CPC .................................................. H04B 10/077
(Continued)

(56) References Cited

U.S. PATENT DOCUMENTS 8,891,957 B2 * 11/2014 Mu .................. H04B 10/07955
                                                                    398/1
2011/0311216 A1 * 12/2011 Inoue .................... H04B 10/27
                                                                    398/1
(Continued)

FOREIGN PATENT DOCUMENTS

EP        4067954 A1 * 10/2022 ............. H04B 10/80
JP    H08-298486 A    11/1996
(Continued)

OTHER PUBLICATIONS

International Search Report for PCT Application No. PCT/JP2021/046476, mailed on Mar. 8, 2022.
(Continued)

*Primary Examiner* — Amritbir K Sandhu
(74) *Attorney, Agent, or Firm* — Sughrue Mion, PLLC

(57) ABSTRACT

The transmission apparatus: detects a first command signal superimposed on a first optical signal traveling in an optical undersea cable; detects a first response signal superimposed by a first another optical undersea apparatus on a second optical signal traveling in an opposite direction in the optical undersea cable, the first response signal being a response signal to the first command signal; if a first stage, which is the stage of first transmission permission information, is a first setting stage, superimposes a first response signal being a response signal to the first command signal and is addressed to an optical undersea apparatus, on the second optical signal; and updates a first superimposing unit and the first stage in view of the number of completions of detection of the first command signal addressed to the first another optical undersea apparatus and the number of completions of detection of the first response signal.

18 Claims, 10 Drawing Sheets

(58) Field of Classification Search
USPC ............................................................ 398/9
See application file for complete search history.

(56) References Cited

U.S. PATENT DOCUMENTS

| 2012/0177362 A1* | 7/2012 | Zhang ................. | H04J 14/0202 |
| | | | 398/9 |
| 2015/0318926 A1 | 11/2015 | Zhang et al. | |

FOREIGN PATENT DOCUMENTS

| JP | H10256995 A | * | 9/1998 | |
| JP | H10262030 A | * | 9/1998 | |
| JP | 2003-032190 A | | 1/2003 | |
| JP | 2003-060592 A | | 2/2003 | |
| JP | 2014-197788 A | | 10/2014 | |
| WO | WO-2019087520 A1 | * | 5/2019 | ............ H04B 10/03 |
| WO | 2019/116776 A1 | | 6/2019 | |
| WO | 2020/137821 A1 | | 7/2020 | |

OTHER PUBLICATIONS

English translation of Written opinion for PCT Application No. PCT/JP2021/046476, mailed on Mar. 8, 2022.

* cited by examiner

Fig.2

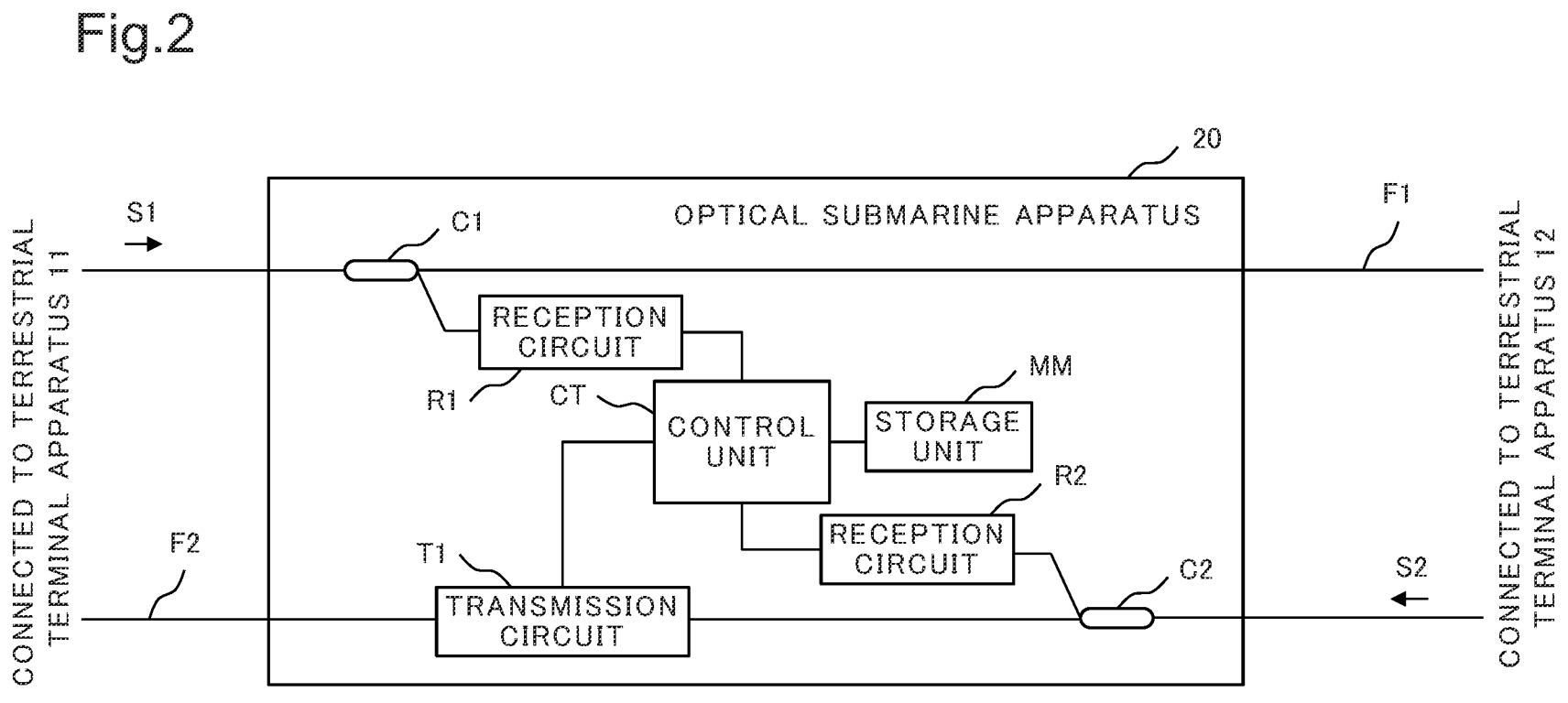

CONNECTED TO TERRESTRIAL
TERMINAL APPARATUS 12

F1

S2 ↓

OPTICAL SUBMARINE APPARATUS

20

C1

RECEPTION
CIRCUIT

R1

CT

CONTROL
UNIT

STORAGE
UNIT

MM

RECEPTION
CIRCUIT

R2

C2

TRANSMISSION
CIRCUIT

T1

S1 ↑

F2

CONNECTED TO TERRESTRIAL
TERMINAL APPARATUS 11

TRANSMISSION APPARATUS, TRANSMISSION METHOD, AND RECORDING MEDIUM OF TRANSMISSION PROGRAM

This application is a National Stage Entry of PCT/JP2021/046476 filed on Dec. 16, 2021, which claims priority from Japanese Patent Application 2020-210946 filed on Dec. 21, 2020, the contents of all of which are incorporated herein by reference, in their entirety.

TECHNICAL FIELD

The present invention relates to a transmission apparatus, a transmission method, and a recording medium of a transmission program in an optical submarine apparatus responding to a command signal from a terrestrial terminal apparatus.

BACKGROUND ART

In recent years, a function of transmitting a response signal to a terrestrial terminal apparatus being a source of a command signal in response to the command signal transmitted from the terrestrial terminal apparatus is required in an optical submarine apparatus included in an optical submarine cable system. The function allows acquisition of various types of information, such as setting information of the optical submarine apparatus, various alarms, and monitored values, from the terrestrial terminal apparatus.

PTL 1 discloses an optical transmission apparatus outputting a signal including control information from a first optical signal including a main signal and a control signal, executing control, based on the control information, and outputting a response signal in a wavelength band different from that of the main signal in accordance with the control.

PTL 2 discloses a submarine optical transmission apparatus including an optical component processing an optical signal output by an optical transmission apparatus, a control unit controlling the optical component, and a reception unit receiving an optical signal and a control signal, converting the control signal into an electric signal, and outputting the resulting signal to the control unit.

PTL 3 discloses a method for monitoring an optical repeater including: by a terminal, superposing a modulated first auxiliary signal on a main signal and transmitting the resulting signal; and, by an optical repeater, superposing a second auxiliary signal at a frequency different from that of the first auxiliary signal on the main signal, the second auxiliary signal being modulated by a response signal, and returning the resulting signal to the terminal.

CITATION LIST

Patent Literature

PTL 1: International Application Publication No. WO 2020/137821

PTL 2: International Application Publication No. WO 2019/116776

PTL 3: Japanese Unexamined Patent Application Publication No. H08-298486

SUMMARY OF INVENTION

Technical Problem

When an optical submarine cable system is equipped with a function of transmitting a response signal as described in the Background Art section, there is apprehension that crosstalk occurs between response signals from optical submarine apparatuses to a terrestrial terminal apparatus as the number of optical submarine apparatuses transmitting the response signals through a single optical fiber increases.

As a method for avoiding the crosstalk, a method of, after transmitting a command signal from the terrestrial terminal apparatus to an optical submarine apparatus, the terrestrial terminal apparatus not transmitting another command signal until receiving a response signal to the command signal is considered. However, the method does not allow the terrestrial terminal to consecutively transmit a plurality of command signals and further requires complicated transmission timing control of command signals at the terrestrial terminal apparatus.

In order to avoid the issue, a method of setting a wavelength band for a response signal for each optical submarine apparatus is considered. However, applying the method increases the width of a wavelength band for response signals. Therefore, the number of wavelength bands that can be allocated to optical signals for communication decreases and channel capacity is reduced. An "optical signal for communication" herein refers to an optical signal used for optical communication performed between terrestrial terminal apparatuses.

In order to avoid the issue, a method of transmitting response signals by modulating optical signals for communication in different frequency bands set to the optical signals for communication for respective optical submarine apparatuses is considered. However, the method has an issue of complicatedness in demodulation due to coexistence of a plurality of frequencies at which the optical signals for communication are modulated.

An object of the present invention is to provide a transmission apparatus and the like that can facilitate transmission timing control of a command signal and demodulation of a response signal at a terrestrial terminal apparatus and can secure a wider frequency band for communication.

Solution to Problem

A transmission apparatus according to the present invention includes: a first detection unit detecting a first command signal superposed on a first optical signal traveling through an optical submarine cable in a first direction; a second detection unit detecting a first response signal being a response signal to the first command signal and being superposed on a second optical signal traveling through the optical submarine cable in a second direction by a first separate optical submarine apparatus being an optical submarine apparatus other than an own optical submarine apparatus being an optical submarine apparatus including an own transmission apparatus; a first superposition unit superposing, on the second optical signal, a first response signal being a response signal to the first command signal a destination of which is the own optical submarine apparatus, when a first stage being a stage of first transmission permission information is a first setting stage; and a first update unit updating the first stage, based on a detection completion count of the first command signal the destination of which is the first separate optical submarine apparatus and a detection completion count of the first response signal.

A transmission method according to the present invention is a transmission method in an optical submarine apparatus included in an optical submarine cable system performing optical communication through an optical submarine cable, the transmission method including procedures of: detecting a first command signal superposed on a first optical signal traveling through the optical submarine cable in a first direction; detecting a first response signal being a response signal to the first command signal and being superposed on a second optical signal traveling through the optical submarine cable in a second direction by a first separate optical submarine apparatus being an optical submarine apparatus other than an own optical submarine apparatus; superposing, on the second optical signal, a first response signal being a response signal to the first command signal a destination of which is the own optical submarine apparatus, when a first stage being a stage of first transmission permission information is a first setting stage; and updating the first stage, based on a detection completion count of the first command signal the destination of which is the first separate optical submarine apparatus and a detection completion count of the first response signal.

A recording medium of a transmission program according to the present invention is a recording medium on which a program is recorded, the program causing a computer included in an optical submarine apparatus included in an optical submarine cable system performing optical communication through an optical submarine cable to execute: processing of detecting a first command signal superposed on a first optical signal traveling through the optical submarine cable in a first direction; processing of detecting a first response signal being a response signal to the first command signal and being superposed on a second optical signal traveling through the optical submarine cable in a second direction by a first separate optical submarine apparatus being an optical submarine apparatus other than an own optical submarine apparatus; processing of superposing, on the second optical signal, a first response signal being a response signal to the first command signal a destination of which is the own optical submarine apparatus, when a first stage being a stage of first transmission permission information is a first setting stage; and processing of updating the first stage, based on a detection completion count of the first command signal the destination of which is the first separate optical submarine apparatus and a detection completion count of the first response signal.

Advantageous Effects of Invention

A transmission apparatus and the like according to the present invention can facilitate transmission timing control of a command signal and demodulation of a response signal at a terrestrial terminal apparatus and can secure a wider frequency band for communication.

BRIEF DESCRIPTION OF DRAWINGS

FIG. 2 is a conceptual diagram illustrating a configuration example of an optical submarine apparatus according to the first example embodiment.

FIG. 6 is a conceptual diagram illustrating a specific example of a timing chart of each operation and the like.

EXAMPLE EMBODIMENT

First Example Embodiment

In an optical submarine cable system according to the present example embodiment, one terrestrial terminal apparatus transmits a command signal (first command signal) to an optical submarine apparatus. Then, the optical submarine apparatus transmits a response signal (first response signal) to the first command signal to the terrestrial terminal apparatus.

Configuration and Operation

Figure 1:
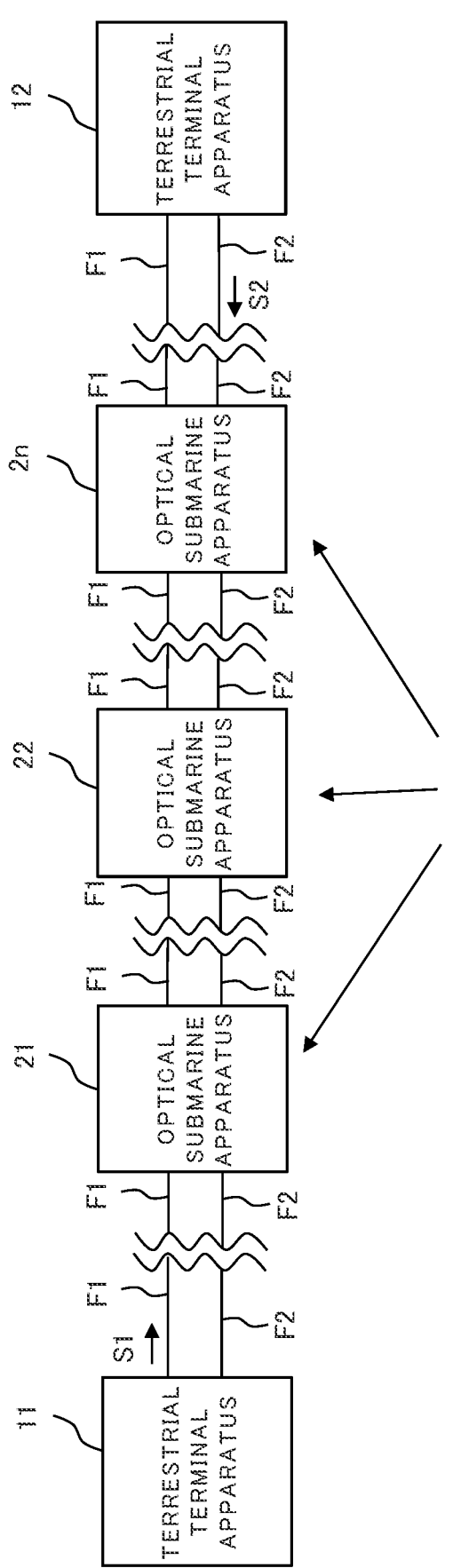
FIG. 1 is a conceptual diagram illustrating a configuration example of an optical submarine cable system according to a first example embodiment.

FIG. 1 is a conceptual diagram illustrating a configuration of an optical submarine cable system 10 being an example of the optical submarine cable system according to the present example embodiment. The optical submarine cable system 10 includes terrestrial terminal apparatuses 11 and 12 and optical submarine apparatuses 21 to 2*n*. The optical submarine cable system 10 is for performing bidirectional optical communication between the terrestrial terminal apparatus 11 and the terrestrial terminal apparatus 12 through an optical submarine cable including optical fibers F1 and F2.

Optical communication from the terrestrial terminal apparatus 11 to the terrestrial terminal apparatus 12 is performed by an optical signal S1 traveling through the optical fiber F1. On the other hand, optical communication from the terrestrial terminal apparatus 12 to the terrestrial terminal apparatus 11 is performed by an optical signal S2 traveling through the optical fiber F2. Each of the optical fibers F1 and F2 includes one or a plurality of optical fibers.

Each of the optical submarine apparatuses 21 to 2*n* being n optical submarine apparatuses is an optical submarine apparatus transmitting a first response signal to the terrestrial terminal apparatus 11 by superposing the first response signal on the optical signal S2, the first response signal being a response signal to a first command signal transmitted by being superposed on the optical signal S1 by the terrestrial terminal apparatus 11. Note that n is an integer equal to or greater than 2. When n is equal to 2, the optical submarine apparatus 2*n* is deleted from FIG. 1.

The frequency band of a first command signal is set in such a way as not to overlap the frequency band of an optical signal for communication included in the optical signal S1. For example, the frequency band of a first command signal is set lower than the frequency band of an optical signal for communication included in the optical signal S1.

The frequency band of a first response signal is set in such a way as not to overlap the frequency band of an optical signal for communication included in the optical signal S2. For example, the frequency band of a second response signal is set lower than the frequency band of an optical signal for communication included in the optical signal S2. Whether the frequency band of a first command signal overlaps the frequency band of a first response signal is not particularly determined.

An optical submarine apparatus transmitting a first response signal to the terrestrial terminal apparatus 11 by superposing the first response signal on the optical signal S2 in response to a first command signal transmitted by being superposed on the optical signal S1 by the terrestrial terminal apparatus 11 is hereinafter referred to as a "first target optical submarine apparatus." Examples of an optical submarine apparatus include an optical repeater apparatus and a branch apparatus.

An optical submarine apparatus other than a first target optical submarine apparatus may be installed between the terrestrial terminal apparatus 11 and the optical submarine apparatus 21, between two adjacent first target optical submarine apparatuses, or between the optical submarine apparatus 2n and the terrestrial terminal apparatus 12.

FIG. 2 is a conceptual diagram illustrating a configuration of an optical submarine apparatus 20 being an example of each of the optical submarine apparatuses 21 to 2n in FIG. 1. The optical submarine apparatus 20 includes reception circuits R1 and R2, a control unit CT, a storage unit MM, a transmission circuit T1, and optical couplers C1 and C2.

Part of the optical signal S1 transmitted from the terrestrial terminal apparatus 11 through the optical fiber F1 is split by the optical coupler C1 and is input to the reception circuit R1. There is a time period in which a first command signal transmitted from the terrestrial terminal apparatus 11 to one of first target optical submarine apparatuses is superposed on the optical signal S1.

On the other hand, part of the optical signal S2 transmitted from the terrestrial terminal apparatus 12 through the optical fiber F2 is split by the optical coupler C2 and is input to the reception circuit R2. There is a time period in which a first response signal from a first target optical submarine apparatus between the terrestrial terminal apparatus 12 and the optical submarine apparatus 20 is superposed on the optical signal S2. A first response signal is a response signal to a first command signal.

The reception circuit R1 receives a first command signal superposed on the input optical signal S1. A first command signal may be a signal directed to the optical submarine apparatus 20 or a signal directed to another first target optical submarine apparatus. The reception circuit R1 sends the received signal of the first command signal to the control unit CT regardless of whether the first command signal is a signal directed to the optical submarine apparatus 20 or a signal directed to another first target optical submarine apparatus.

When a first response signal is superposed on the input optical signal S2, the reception circuit R2 receives the first response signal. The reception does not necessarily be at a level allowing recognition of the source and the content of the first response signal. For example, the reception may be detection at a level allowing recognition of the signal as a first response signal.

A first response signal received by the reception circuit R2 is a signal from a first target optical submarine apparatus between the optical submarine apparatus 20 and the terrestrial terminal apparatus 12. The reception circuit R2 sends the reception information of the first response signal to the control unit CT.

When receiving sending of a received signal of a first command signal from the reception circuit R1, the control unit CT determines whether the destination of the first command signal is the optical submarine apparatus 20. The first command signal includes the identifier of a first target optical submarine apparatus specified as the destination of the first command signal by the terrestrial terminal apparatus 11. Then, the storage unit MM holds the identifier of the optical submarine apparatus 20. Therefore, the control unit CT can make the determination, based on the identifier indicating the destination included in the first command signal and the identifier of the optical submarine apparatus 20 held by the storage unit MM.

When receiving transmission of a first command signal directed to the optical submarine apparatus 20 from the terrestrial terminal apparatus 1, the control unit CT generates first response information related to the instruction content of the first command signal and stores the generated first response information into the storage unit MM. Then, the control unit CT makes a determination about whether a first transmission permission value held by the storage unit MM is 0. The first transmission permission value is an integer equal to or greater than 0, means that transmission of first response information to the terrestrial terminal apparatus 11 is enabled when the value is 0, and means that transmission of the first response information to the terrestrial terminal apparatus 11 is disabled when the value is nonzero.

When the first transmission permission value is 0, the control unit CT causes the transmission circuit T1 to transmit the first response information held in the storage unit MM to the terrestrial terminal apparatus 11. On the other hand, when the first transmission permission value is nonzero, the control unit CT waits until the first transmission permission value becomes 0 and then causes the transmission circuit T1 to transmit the first response information to the terrestrial terminal apparatus 11.

The control unit CT also updates the first transmission permission value by an operation described below.

The control unit CT sets an initial value of the first transmission permission value to 0. When the reception circuit R1 completes reception of a first command signal, the control unit CT makes a determination about whether the destination of the first command signal is a first target optical submarine apparatus between the optical submarine apparatus 20 and the terrestrial terminal apparatus 12. The definition of a first target apparatus is as described above. A first target optical submarine apparatus between the optical submarine apparatus 20 and the terrestrial terminal apparatus 12 is hereinafter referred to as a "monitored first target optical submarine apparatus." A "monitored first target optical submarine apparatus" is a first target optical submarine apparatus an optical cable distance of which from the terrestrial terminal apparatus 11 is longer than that of the optical submarine apparatus 20. The optical cable distance is a length along an optical cable. A "monitored first target optical submarine apparatus" is also a first target optical apparatus positioned farther in the traveling direction of the optical signal S1 than the optical submarine apparatus 20.

The storage unit MM holds the identifier of a monitored first target optical submarine apparatus. Therefore, the control unit CT can make the determination, based on the identifier indicating the destination included in the first command signal and the identifier of the monitored first target optical submarine apparatus held by the storage unit MM. When the destination of the first command signal reception of which is completed is a monitored first target optical submarine apparatus, the control unit CT increments the value of the first transmission permission value by one.

Further, when the reception circuit R2 completes reception of a first response signal superposed on the optical signal S2, the control unit CT decrements the value of the first transmission permission value by one.

The first transmission permission value being 0 means that transmission of first response signals from monitored first target optical submarine apparatuses to the terrestrial terminal apparatus 11 in response to first command signals transmitted to the first target optical submarine apparatuses up to that point is fully completed. Accordingly, even when the optical submarine apparatus 20 superposes a first response signal from the optical submarine apparatus 20 on the optical signal S2 to the terrestrial terminal apparatus 11, a first response signal from another first target optical submarine apparatus is not superposed on the optical signal S2. Therefore, by the aforementioned operation, the control unit CT can avoid a plurality of first response signals being superposed on the optical signal S2. Therefore, the optical submarine apparatus 20 can avoid the issue of the difficulty in demodulation of a first response signal at the terrestrial terminal apparatus 11 due to superposition of a plurality of first response signals on the optical signal S2.

The storage unit MM in FIG. 2 includes a recording medium that can non-transitorily hold recorded information. A program and information required for the control unit CT to perform the aforementioned operation are previously recorded on the recording medium. The storage unit MM stores information indicated by the control unit CT. Further, the storage unit MM sends the information indicated by the control unit CT to the control unit CT.

The transmission circuit T1 transmits information and a signal indicated by the control unit CT to the terrestrial terminal apparatus 11 by superposing the information and the signal on the optical signal S2.

Next, a specific example of processing being related to the operation described above and being performed by the control unit CT will be described with reference to a flowchart.

Figure 3:
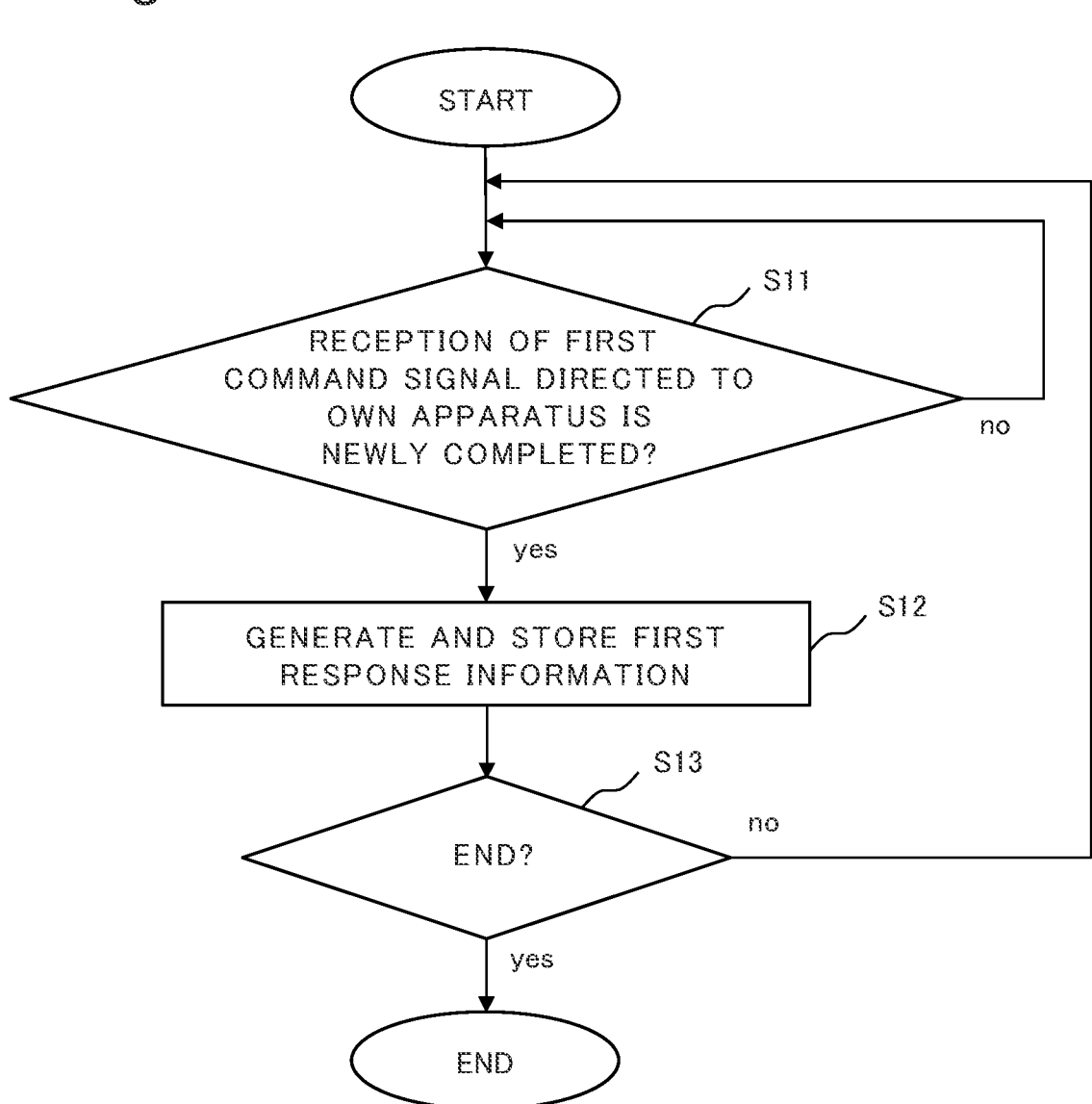
FIG. 3 is a conceptual diagram illustrating an example of storage processing of first response information.

FIG. 3 is a conceptual diagram illustrating an example of storage processing of first response information performed by the control unit CT in response to transmission of a first command signal. For example, the control unit CT starts the processing in FIG. 3 by external input of a start signal.

Then, as processing in S11, the control unit CT first makes a determination about whether reception of a first command signal directed to the optical submarine apparatus 20 is completed by the reception circuit R1. When the determination result by the processing in S11 is yes, the control unit CT performs processing in S12. On the other hand, when the determination result by the processing in S11 is no, the control unit CT performs the processing in S11 again and waits for new completion of reception of a first command signal.

When performing the processing in S12, the control unit CT generates first response information in response to instruction information included in the received first command signal and causes the storage unit MM to hold the generated first response information, as the processing. The content of the instruction information is not particularly determined. For example, it is assumed that the instruction information is sending of information about the temperature detected by a temperature sensor at a predetermined position in the optical submarine apparatus 20. In that case, the control unit CT acquires temperature information from the temperature sensor, generates first response information including the temperature information, and causes the storage unit MM to hold the information.

Then, as the processing in S13, the control unit CT makes a determination about whether to end the processing in FIG.

3. For example, the control unit CT makes the determination by determining whether end information is externally input.

When the determination result by the processing in S13 is yes, the control unit CT ends the processing in FIG. 3. On the other hand, when the determination result by the processing in S13 is no, the control unit CT performs the processing in S11 again.

Figure 4:
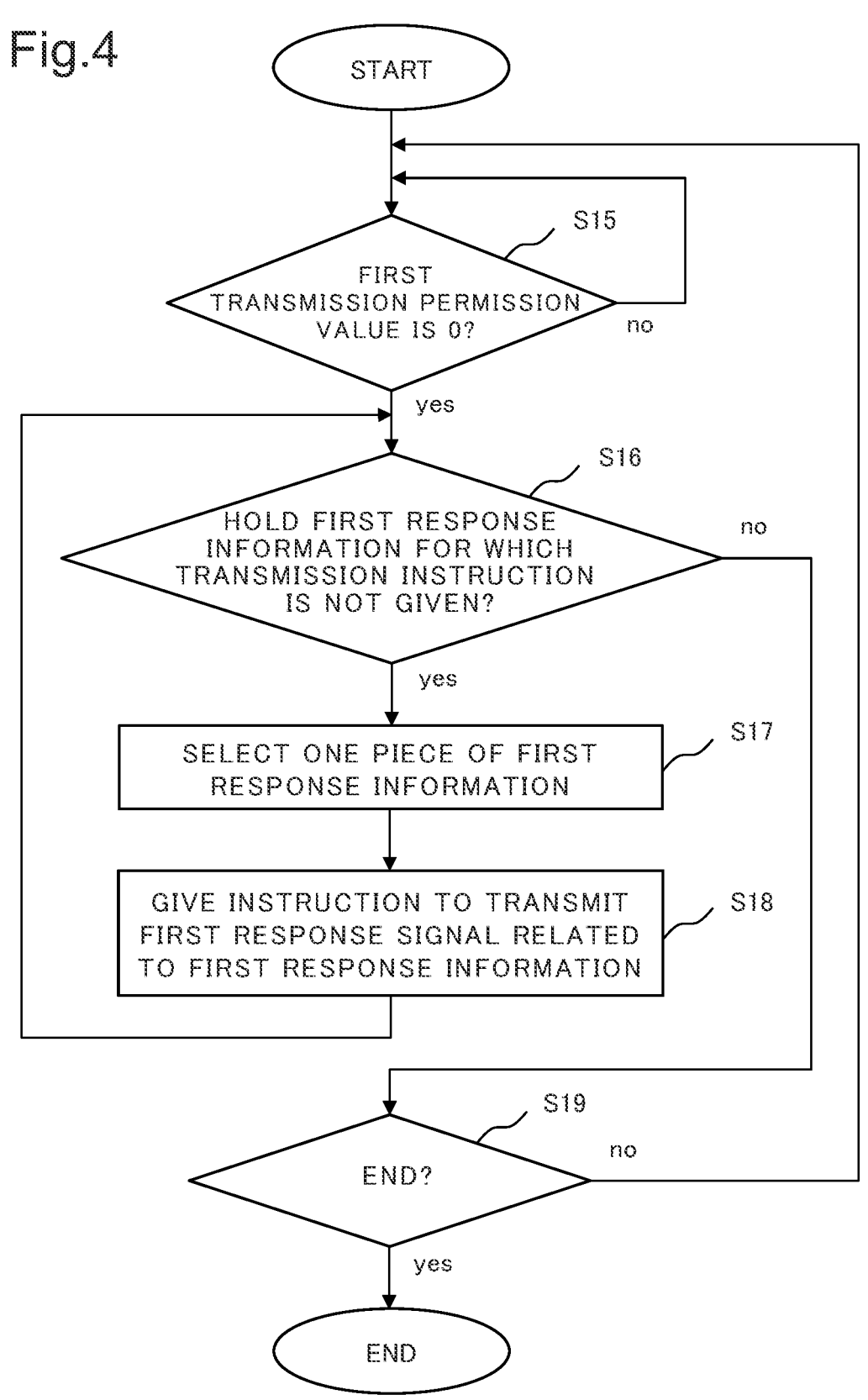
FIG. 4 is a conceptual diagram illustrating an example of transmission processing of a first response signal.

FIG. 4 is a conceptual diagram illustrating an example of transmission processing of a first response signal performed by the control unit CT. For example, the control unit CT starts the processing in FIG. 4 by external input of a start signal.

Then, as processing in S15, the control unit CT first makes a determination about whether the most recent first transmission permission value held by the storage unit MM is 0. When the determination result by the processing in S15 is yes, the control unit CT performs processing in S16. On the other hand, when the determination result by the processing in S15 is no, the control unit CT performs the processing in S15 again and waits for the first transmission permission value to become 0.

When performing the processing in S16, the control unit CT makes a determination about whether the storage unit MM holds first response information, as the processing. When the determination result by the processing in S16 is yes, the control unit CT performs processing in S17. On the other hand, when the determination result by the processing in S16 is no, the control unit CT performs processing in S19.

When performing the processing in S17, the control unit CT selects one piece of first response information held by the storage unit MM, as the processing. Then, as processing in S18, the control unit CT instructs the transmission circuit T1 to transmit a first response signal related to the selected first response information.

Then, as the processing in S19, the control unit CT makes a determination about whether to end the processing in FIG. 4. For example, the control unit CT makes the determination by determining whether end information is externally input.

When the determination result by the processing in S19 is yes, the control unit CT ends the processing in FIG. 4. On the other hand, when the determination result by the processing in S19 is no, the control unit CT performs the processing in S15 again.

Figure 5:
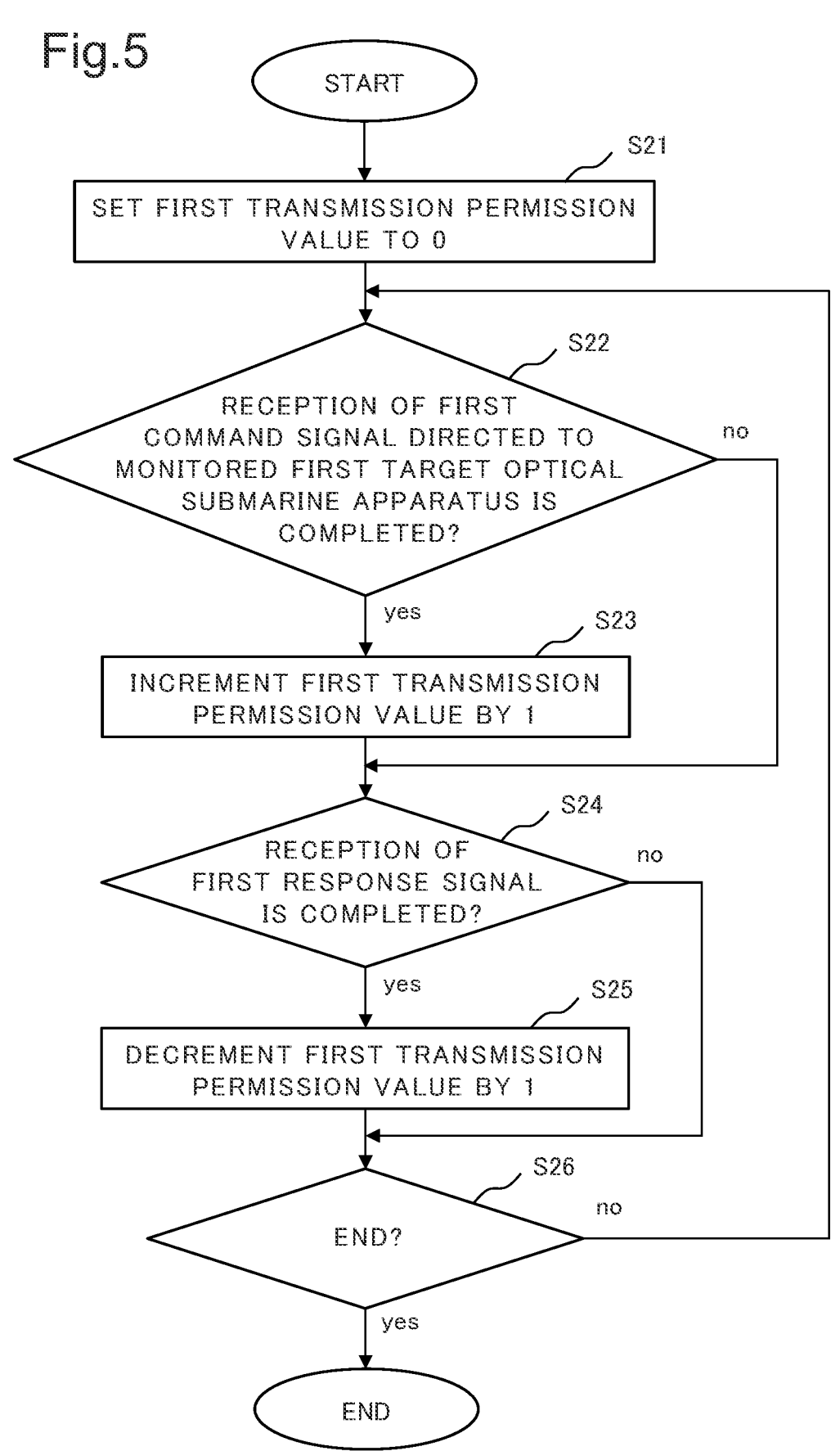
FIG. 5 is a conceptual diagram illustrating an example of update processing of a first transmission permission value.

FIG. 5 is a conceptual diagram illustrating an example of update processing of the first transmission permission value performed by the control unit CT. The processing in FIG. 5 is performed in parallel with the processing in FIG. 3. For example, the control unit CT starts the processing in FIG. 5 by external input of a start signal. Then, as processing in S21, the control unit CT first sets the first transmission permission value to 0.

Next, as processing in S22, the control unit CT makes a determination about whether a first command signal directed to a monitored first target optical submarine apparatus is received by the reception circuit R1.

When the determination result by the processing in S22 is yes, the control unit CT performs processing in S23. On the other hand, when the determination result by the processing in S22 is no, the control unit CT skips the processing in S23 and performs processing in S24. When performing the processing in S23, the control unit CT increments the first transmission permission value by one, as the processing. Then, the control unit CT performs the processing in S24.

When performing the processing in S24, the control unit CT makes a determination about whether a first response signal is received by the reception circuit R2, as the processing. When the determination result by the processing in S24 is yes, the control unit CT performs processing in S25. On the other hand, when the determination result by the processing in S24 is no, the control unit CT skips the processing in S25 and performs processing in S26. When performing the processing in S25, the control unit CT decrements the first transmission permission value by one, as the processing. Then, the control unit CT performs the processing in S26.

When performing the processing in S26, the control unit CT makes a determination about whether to end the processing in FIG. 5, as the processing. For example, the control unit CT makes the determination by determining whether end information is externally input.

When the determination result by the processing in S26 is yes, the control unit CT ends the processing in FIG. 5. On the other hand, when the determination result by the processing in S26 is no, the control unit CT performs the processing in S22 again.

Figure 6:
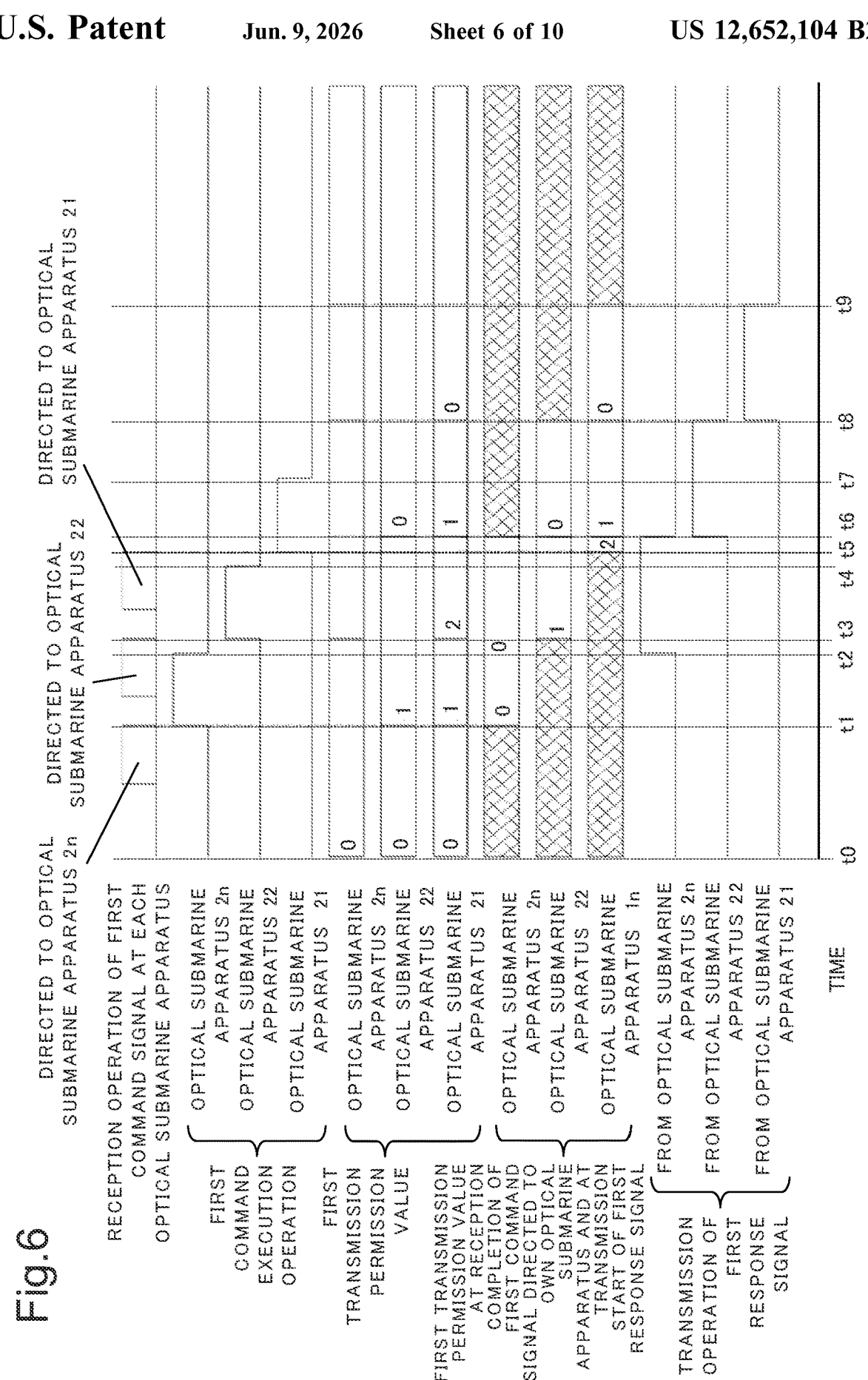

FIG. 6 is a conceptual diagram illustrating a specific example of a timing chart of each operation and the like in the optical submarine apparatuses 21, 22, and 2n in FIG. 1. The each operation and the like refer to a reception operation of a first command signal, a command execution operation, the first transmission permission value, the first transmission permission values at the completion of reception of a first command signal and at the start of transmission of a first response signal, and a reception operation of a first response signal.

Note that an order of reception, a reception timing, a reception period, the time required for the command execution operation of a first command signal at each optical submarine apparatus, the transmission times of a first response signal, and the like in FIG. 6 are assumed simply for FIG. 6. It is assumed in FIG. 6 that first command signals are received in an order of a signal directed to the optical submarine apparatus 2n, a signal directed to the optical submarine apparatus 22, and a signal directed to the optical submarine apparatus 21 at each optical submarine apparatus.

At a time t0, none of the optical submarine apparatuses 21, 22, and 2n receive a first command signal directed to any first target optical submarine apparatus. Therefore, the first transmission permission value held by each target optical submarine apparatus is 0.

At a time t1, each of the optical submarine apparatuses 21, 22, and 2n completes the reception operation of a first command signal directed to the optical submarine apparatus 2n. It is assumed that the difference in the arrival time of the optical signal S1 between the optical submarine apparatuses due to the difference in the propagation distance of light through the optical fiber F1 is negligible.

In response to completion of the reception operation of the first command signal, the optical submarine apparatus 2n determines yes by the processing in S11 in FIG. 3 and performs the processing in S12. Then, the optical submarine apparatus 2n determines yes in the processing in S15 in FIG. 4 and performs the processing in S16, S17, and S18. Thus, the optical submarine apparatus 2n starts the transmission operation of a first response signal at a time t2. The transmission operation continues until a time t6.

On the other hand, each of the optical submarine apparatuses 21 and 22 determines yes by the processing in S22 in FIG. 5 at the time t1 and sets the first transmission permission value to 1 by the processing in S23.

At a time t3 before the time t6, the reception operation of the first command signal directed to the optical submarine apparatus 22 by each optical submarine apparatus is completed. In response to completion of the reception operation of the first command signal, the optical submarine apparatus 22 determines yes by the processing in S11 in FIG. 3 and performs the processing in S12. Then, the optical submarine apparatus 22 determines no by the processing in S15 in FIG. 4 and waits for the first transmission permission value to become 0 by repeating the processing in S15.

On the other hand, at the time t3, the optical submarine apparatus 21 determines yes by the processing in S22 in FIG. 5 and sets the first transmission permission value to 2 by the processing in S23. Further, at the time t3, since the optical submarine apparatus 22 being the destination of the command signal is not a monitored first target optical submarine apparatus, the optical submarine apparatus 2n determines no by the processing in S22 in FIG. 5. Then, the optical submarine apparatus 2n skips the processing in S23 and maintains the first transmission permission value at 0.

Subsequently, at a time t4 before a time t5 and the t6, the command execution operation (S12 in FIG. 3) by the optical submarine apparatus 22 is completed. The first transmission permission value of the optical submarine apparatus 22 at the time t4 is 1. Therefore, the optical submarine apparatus 22 determines no in the processing in S13 in FIG. 3 and waits for the first transmission permission value to become 0 by repeating the processing in S13 until the first transmission permission value becomes 0.

Subsequently, at the time t5, the reception operation of the first command signal directed to the optical submarine apparatus 21 at each of the optical submarine apparatuses 21, 22, and 2n is completed. In response, the optical submarine apparatus 21 determines yes by the processing in S11 in FIG. 3 and perform the processing in S12 at the time t5. Then, the optical submarine apparatus 21 determines no by the processing in S15 in FIG. 4 and waits for the first transmission permission value to become 0 by repeating the processing in S15.

On the other hand, since the destination of the first command signal the reception operation of which is completed at the time t5 is not a monitored first target optical submarine apparatus, the optical submarine apparatus 22 determines no by the processing in S22 in FIG. 5. Then, the optical submarine apparatus 22 skips the processing in S23 and maintains the first transmission permission value at 1.

Since the destination of the first command signal the reception operation of which is completed at the time t5 is not a monitored first target optical submarine apparatus, the optical submarine apparatus 2n determines no by the processing in S22 in FIG. 5. Then, the optical submarine apparatus 2n skips the processing in S23 and maintains the first transmission permission value at 0.

Then, at the time t6, the optical submarine apparatus 2n completes the transmission operation of a first response signal. Then, each of the optical submarine apparatuses 21 and 22 completes the reception operation of the first response signal. In response to completion of the reception operation, the optical submarine apparatus 21 determines yes by the processing in S24 in FIG. 5 at the time t6. Then, the optical submarine apparatus 21 sets the first transmission permission value to 1 by the processing in S25.

Further, at the time t6, the optical submarine apparatus 22 determines yes by the processing in S24 in FIG. 5. Then, the optical submarine apparatus 22 sets the first transmission permission value to 0 by the processing in S25.

In response to the first transmission permission value becoming 0, the optical submarine apparatus 22 sets the determination result by the processing in S16 in FIG. 4 to yes. Then, the optical submarine apparatus 22 starts the transmission operation of a first response signal including first response information by the processing in S17 and S18 in FIG. 4. The transmission continues until a time t8.

At a time t7 before the time t8, the command execution operation (the processing in S12 in FIG. 3) by the optical submarine apparatus 21 is completed. The first transmission permission value of the optical submarine apparatus 21 at the time t7 is 1. Therefore, the optical submarine apparatus 21 waits for the first transmission permission value to become 0 by repeating the processing in S15 in FIG. 4.

Subsequently, at the time t8, the optical submarine apparatus 22 completes the transmission operation of a first response signal. In response, the optical submarine apparatus 21 completes the reception operation of the first response signal at the time t8. Then, the optical submarine apparatus 21 sets the determination result by the processing in S24 in FIG. 5 to yes and sets the first transmission permission value to 0 by the processing in S25.

In response to the first transmission permission value becoming 0 at the time t8, the optical submarine apparatus 21 sets the determination result in S15 in FIG. 4 to yes. Then, the optical submarine apparatus 21 determines yes by the processing in S16 and starts the transmission operation a first response signal by the processing in S17 and S18. The transmission operation continues until a time t9.

Effect

The optical submarine apparatus according to the present example embodiment transmits a first response signal in response to a first command signal reception of which is completed, the signal being directed to the own optical submarine apparatus, only when the held first transmission permission value is 0. The optical submarine apparatus increments the first transmission permission value by one when reception of a first command signal directed to an optical submarine apparatus the optical cable distance of which from a terrestrial terminal apparatus transmitting the first command signal is longer than that of the own optical submarine apparatus (monitored first target optical submarine apparatus) is completed. The optical submarine apparatus decrements the first transmission permission value by one when reception of a first response signal is completed.

The first transmission permission value being 0 means that transmission of first response signals from monitored optical submarine apparatuses in response to first command signals transmitted to the first target optical submarine apparatuses up to that point is fully completed. Accordingly, even when the optical submarine apparatus superposes a first response signal on an optical signal, a first response signal from another first target optical submarine apparatus is not superposed on the optical signal.

Specifically, the optical submarine apparatus according to the present example embodiment can prevent overlap between a period in which a first response signal from another first target optical submarine apparatus passes through an optical submarine cable and a period in which the first response signal transmitted by the optical submarine apparatus according to the present example embodiment passes through the optical submarine cable. Therefore, the optical submarine apparatus according to the present example embodiment can equalize the frequency band of a first response signal from each first target optical submarine apparatus.

Therefore, the optical submarine apparatus according to the present example embodiment can facilitate transmission timing control of a command signal and demodulation of a response signal at a terrestrial terminal apparatus and can secure a wider frequency band for communication.

Second Example Embodiment

For update of the first transmission permission value, the optical submarine apparatus according to the first example embodiment requires processing of determining whether the destination of a first command signal is an optical submarine apparatus the optical cable distance of which from a terrestrial terminal apparatus transmitting the first command signal is longer than that of the own optical submarine apparatus. The optical submarine apparatus according to the first example embodiment accordingly requires complicated processing to be executed. An optical submarine apparatus according to the present example embodiment resolves the issue.

Configuration and Operation

A configuration example of an optical submarine cable system according to the present example embodiment is the configuration of the optical submarine cable system 10 in FIG. 1. A configuration example of the optical submarine apparatus according to the present example embodiment is the configuration of the optical submarine apparatus 20 in FIG. 2.

The following operation of an optical submarine apparatus 20 according to the present example embodiment differs from that according to the first example embodiment. A part of the operation performed by the optical submarine apparatus 20 according to the present example embodiment different from that according to the first example embodiment will be mainly described below.

When a reception circuit R1 detects a first command signal the destination of which is other than the optical submarine apparatus 20, a control unit CT in the optical submarine apparatus 20 according to the present example embodiment illustrated in FIG. 2 increments a first transmission permission value by one regardless of the destination of the first command signal. Then, when a reception circuit R2 detects a first response signal, the control unit CT decrements the first transmission permission value by one. Furthermore, the control unit CT sets the first transmission permission value to 0 when a predetermined threshold time (time limit) elapses after the reception completion time of a first response signal to the most recent first command signal the destination of which is other than the optical submarine apparatus 20. For example, a value understood by experience or the like to allow transmission of a first response signal in response to a first command signal to be certainly completed is used as the threshold time (time limit).

A processing example of storage processing of first response information performed by the control unit CT according to the present example embodiment is the processing illustrated in FIG. 3. An example of transmission processing of a first response signal performed by the control unit CT according to the present example embodiment is the processing illustrated in FIG. 4.

Figure 7:
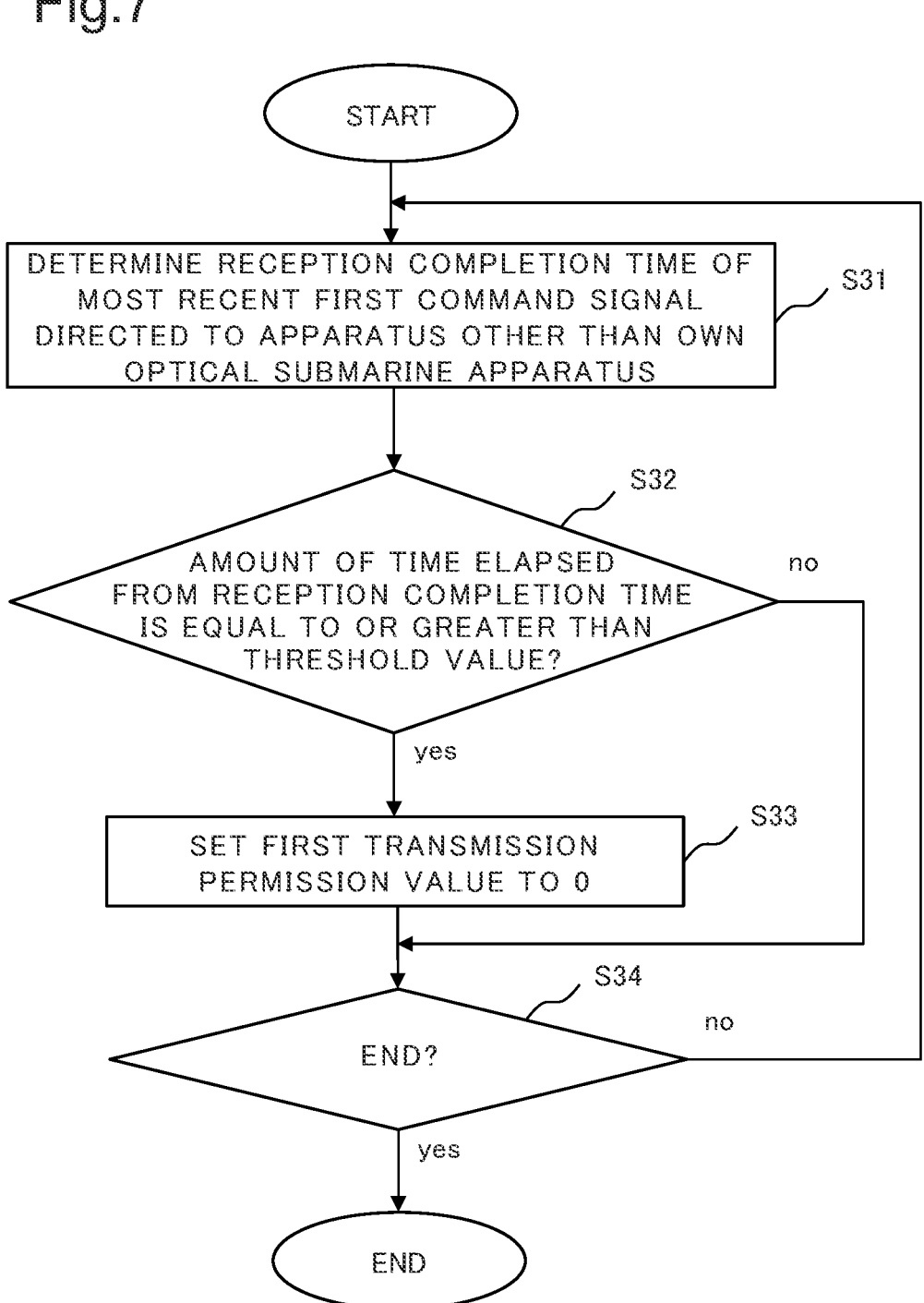
FIG. 7 is a conceptual diagram illustrating an example of update processing of a first transmission permission value (an addition in a second example embodiment).

While performing the processing in FIG. 5, the control unit CT according to the present example embodiment also performs processing in FIG. 7 in parallel with the processing in FIG. 5. FIG. 7 is a conceptual diagram illustrating an example of update processing (an addition in the present example embodiment) of the first transmission permission value performed by the control unit CT according to the present example embodiment.

For example, the control unit CT starts the processing in FIG. 7 by external input of start information. Then, as processing in S31, the control unit CT first determines the reception completion time of the most recent first command signal directed to an apparatus other than the own optical submarine apparatus. Then, as processing in S32, the control unit CT makes a determination about whether an amount of time elapsed from the time determined in S31 exceeds a threshold time (time limit). The threshold time is a time set on the assumption that when an amount of time exceeding the threshold time elapses after reception of a first command signal is completed, transmission of a first response signal is certainly completed.

When the determination result by the processing in S32 is yes, the control unit CT performs processing in S34. On the other hand, when the determination result by the processing in S32 is no, the control unit CT sets the first transmission permission value to 0, as processing in S33. Then, as the processing in S34, the control unit CT makes a determination about whether to end the processing in FIG. 7. For example, the control unit CT makes the determination by determining whether end information is externally input.

When the determination result by the processing in S34 is yes, the control unit CT ends the processing in FIG. 7. On the other hand, when the determination result by the processing in S34 is no, the control unit CT performs the processing in S31 again.

Effect

The optical submarine apparatus according to the present example embodiment sets the first transmission permission value to 0 when, after the most recent reception completion time of a first command signal directed to another optical submarine apparatus, an amount of time assumed to be sufficient for response to the first command signal to be certainly completed elapses. The operation is performed when the number of detected first command signals is greater than the number of detected first response signals. The case of the number of detected first command signals being greater than the number of detected first response signals includes a case of the optical cable distance from a terrestrial terminal apparatus being the source of the first command signals being shorter than that of the optical submarine apparatus according to the present example embodiment. Even in such a case, the optical submarine apparatus according to the present example embodiment can set the first transmission permission value to 0.

Therefore, the optical submarine apparatus according to the present example embodiment does not require the processing of determining whether the destination of a first command signal is an optical submarine apparatus the optical cable distance of which from a terrestrial terminal apparatus transmitting the first command signal is longer than that of the own optical submarine apparatus for update of the first transmission permission value. Accordingly, the optical submarine apparatus according to the present example embodiment can simplify processing to be executed, compared with the optical submarine apparatus according to the first example embodiment.

Third Example Embodiment

The present example embodiment is an example embodiment related to an optical submarine cable system in which both terrestrial terminal apparatuses transmit command signals to an optical submarine apparatus, and the optical submarine apparatus returns response signals.

Configuration and Operation

A configuration example of the optical submarine cable system according to the present example embodiment is the optical submarine cable system 10 in FIG. 1. The optical submarine cable system 10 according to the present example embodiment differs from the optical submarine cable system 10 according to the first example embodiment in the following points. The difference between the optical submarine cable system 10 according to the present example embodiment and the optical submarine cable system 10 according to the first example embodiment will be mainly described below.

A terrestrial terminal apparatus 11 included in the optical submarine cable system 10 according to the present example embodiment in FIG. 1 transmits a first command signal to each of optical submarine apparatuses 21 to 2$n$, similarly to the first example embodiment. Each of the optical submarine apparatuses 21 to 2$n$ transmits, to the terrestrial terminal apparatus 11, a first response signal to a first command signal directed to the own optical submarine apparatus, similarly to the first example embodiment.

Unlike the case of the first example embodiment, a terrestrial terminal apparatus 12 transmits a command signal (second command signal) to each of the optical submarine apparatuses 21 to 2$n$. Each of the optical submarine apparatuses 21 to 2$n$ transmits, to the terrestrial terminal apparatus 12, a response signal (second response signal) to a command signal directed to the own optical submarine apparatus.

The frequency band of a first command signal transmitted by the terrestrial terminal apparatus 11 through an optical fiber F1 and the frequency band of a second response signal transmitted by each of the optical submarine apparatuses 21 to 2$n$ through the optical fiber F1 are set in such a way as not to overlap each other. The reason is that a first command signal and a second response signal may be superposed on an optical signal S1 in the same time period, and in that case, overlap between the frequency bands makes demodulation of the second response signal by the terrestrial terminal apparatus 12 difficult.

The frequency band of a second command signal transmitted by the terrestrial terminal apparatus 12 through an optical fiber F2 and the frequency band of a first response signal transmitted by each of the optical submarine apparatuses 21 to 2$n$ through the optical fiber F2 are set in such a way as not to overlap each other. The reason is that a second command signal and a first response signal may be superposed on an optical signal S2 in the same time period, and in that case, overlap between the frequency bands makes demodulation of the first response signal by the terrestrial terminal apparatus 11 difficult.

Figure 8:
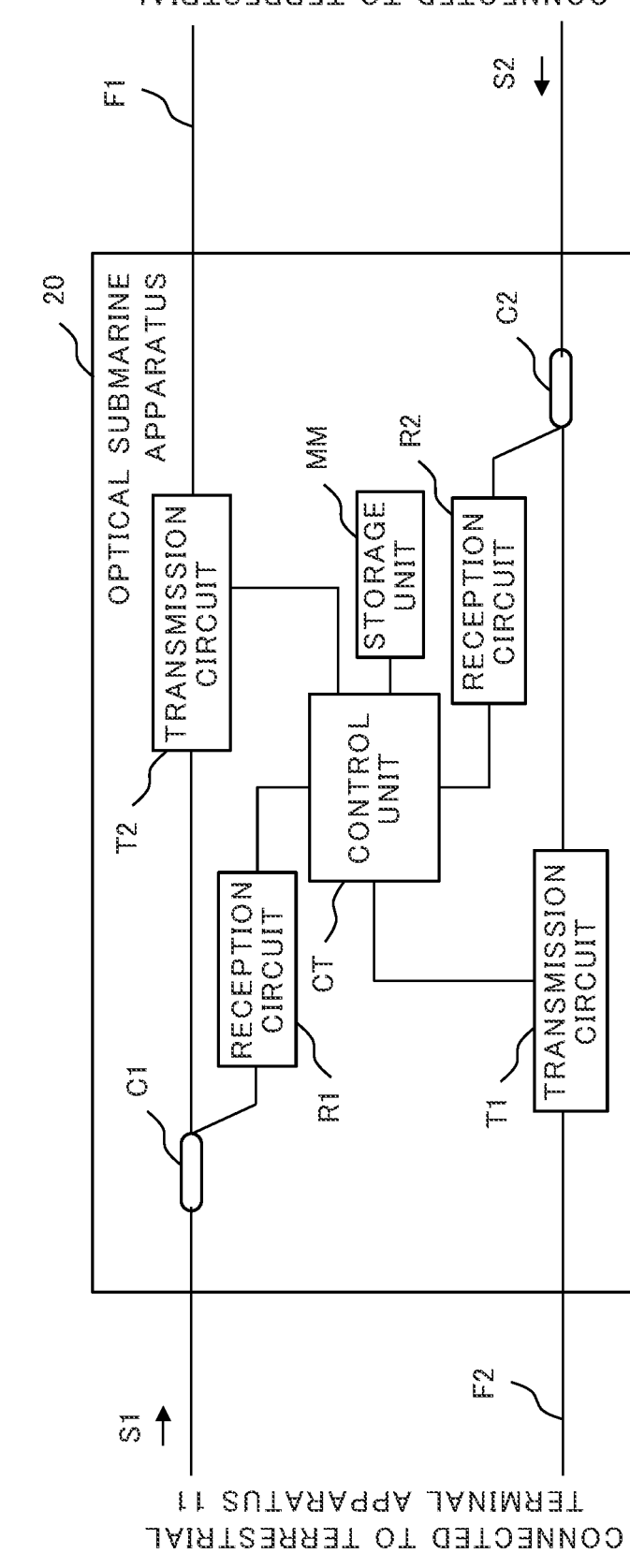
FIG. 8 is a conceptual diagram illustrating a configuration example of an optical submarine apparatus according to a third example embodiment.

FIG. 8 is a conceptual diagram illustrating a configuration of an optical submarine apparatus 20 being an example of the optical submarine apparatus according to the present example embodiment. The optical submarine apparatus 20 in FIG. 8 includes a transmission circuit T2 in addition to the configuration included in the optical submarine apparatus in FIG. 2.

Each of reception circuits R1 and R2, a transmission circuit T1, a control unit CT, and a storage unit MM in FIG. 8 first performs the same operation as a component given the same sign in the first example embodiment in FIG. 2. The reception circuits R1 and R2, the transmission circuit T2, the control unit CT, and the storage unit MM in FIG. 8 also perform operations described below on a second command signal.

There is a time period in which a second command signal transmitted to one of the optical submarine apparatuses by the terrestrial terminal apparatus 12 is superposed on the optical signal S2. There is a time period in which a second response signal from a target optical submarine apparatus between the terrestrial terminal apparatus 11 and the optical submarine apparatus 20 is superposed on the optical signal S2. The second response signal is a response signal to a second command signal.

The reception circuit R2 receives a second command signal. A second command signal received by the reception circuit R2 may be a signal directed to the optical submarine apparatus 20 or a signal directed to another second target optical submarine apparatus. The second target optical submarine apparatus refers to an optical submarine apparatus transmitting (returning) a second response signal to a transmitted second command signal. The reception circuit R2 sends the received signal of the second command signal to the control unit CT.

When a second response signal is superposed on the input optical signal S1, the reception circuit R1 receives the second response signal. The reception circuit R1 sends the received signal of the second response signal to the control unit CT.

When receiving sending of a received signal of a second command signal from the reception circuit R2, the control unit CT determines whether the destination of the second command signal is the optical submarine apparatus 20. The second command signal includes the identifier of a second target optical submarine apparatus specified by the terrestrial terminal apparatus 12 as the destination of the second command signal. Then, the storage unit MM holds the identifier of the optical submarine apparatus 20. Therefore, the control unit CT can make the determination, based on the identifier being included in the second command signal and indicating the destination, and the identifier of the optical submarine apparatus 20 held by the storage unit MM.

When receiving transmission of a second command signal directed to the optical submarine apparatus 20 from the terrestrial terminal apparatus 1, the control unit CT generates response information (second response information) related to the instruction content of the second command signal and stores the generated second response information into the storage unit MM. Then, the control unit CT makes a determination about whether a second transmission permission value held by the storage unit MM is 0. The second transmission permission value is an integer equal to or greater than 0, means that transmission of second response information to the terrestrial terminal apparatus 12 is enabled when the value is 0, and means that transmission of second response information to the terrestrial terminal apparatus 12 is disabled when the value is nonzero.

When the second transmission permission value is 0, the control unit CT causes the transmission circuit T2 to transmit the second response information held by the storage unit MM to the terrestrial terminal apparatus 12. On the other hand, when the second transmission permission value is nonzero, the control unit CT waits until the second transmission permission value becomes 0 and then causes the transmission circuit T1 to transmit the second response information to the terrestrial terminal apparatus 11.

The control unit CT also updates the second transmission permission value by an operation described below.

The control unit CT sets an initial value of the second transmission permission value to 0. When the reception circuit R2 completes reception of a second command signal, the control unit CT makes a determination about whether the destination of the second command signal is a second target optical submarine apparatus between the optical submarine apparatus 20 and the terrestrial terminal apparatus 11. A second target optical submarine apparatus between the optical submarine apparatus 20 and the terrestrial terminal apparatus 11 is hereinafter referred to as a "monitored second target optical submarine apparatus." A "monitored second target optical submarine apparatus" is a second target optical submarine apparatus the optical cable distance of which from the terrestrial terminal apparatus 12 is longer than that of the optical submarine apparatus 20. As described above, the optical cable distance is a length along an optical cable. A monitored second target optical submarine apparatus is also a second target optical submarine apparatus positioned farther in the traveling direction of the optical signal S2 than the optical submarine apparatus 20.

The storage unit MM holds the identifier of the monitored second target optical submarine apparatus. Therefore, the control unit CT can make the determination, based on the identifier indicating the destination included in the second command signal and the identifier of the monitored second target optical submarine apparatus held by the storage unit MM. When the destination of the second command signal reception of which is completed is the monitored second target optical submarine apparatus, the control unit CT increments the value of the second transmission permission value by one.

When the reception circuit R1 receives a second response signal superposed on the optical signal S1, the control unit CT decrements the value of the second transmission permission value by one.

The second transmission permission value being 0 means that transmission of second response signals from monitored second target optical submarine apparatuses to the terrestrial terminal apparatus 12 in response to second command signals transmitted to the monitored second target optical submarine apparatuses up to that point is fully completed. Accordingly, even when the optical submarine apparatus 20 superposes a second response signal on the optical signal S1 to the terrestrial terminal apparatus 11, a second response signal from another second target optical submarine apparatus is not superposed on the optical signal S1. Therefore, by the aforementioned operation, the control unit CT can avoid a plurality of second response signals being superposed on the optical signal S1.

Specifically, the optical submarine apparatus 20 in FIG. 8 can prevent overlap between a period in which a second response signal from a monitored second target optical submarine apparatus passes through an optical submarine cable and a period in which a second response signal transmitted by the optical submarine apparatus 20 passes through the optical submarine cable. Therefore, the optical submarine apparatus 20 in FIG. 8 can equalize the frequency band of a second response signal from each second target optical submarine apparatus. Therefore, the optical submarine apparatus 20 in FIG. 8 can facilitate transmission timing control of a second command signal and demodulation of a response signal at the terrestrial terminal apparatus 12 and can secure a wider frequency band for communication.
Effect The optical submarine apparatus according to the present example embodiment performs operations similar to those of the optical submarine apparatus according to the first example embodiment on command signals transmitted from both terrestrial terminal apparatuses. In the optical submarine cable system according to the present example embodiment, the frequency band of each command signal and the frequency band of a response signal to each command signal traveling through the same optical fiber in the other direction are set in such a way as not to overlap each other. Based on the above, the optical submarine cable system according to the present example embodiment can avoid the issue of difficulty in demodulation of a response signal at each terrestrial terminal apparatus while simultaneously handling command signals transmitted from both terrestrial terminal apparatuses.

The optical submarine apparatus according to the present example embodiment may perform the operation according to the second example embodiment optical submarine apparatus on both a first command signal and a second command signal. In that case, the optical submarine cable system according to the present example embodiment provides effects provided by the optical submarine cable system according to the second example embodiment in addition to the effects provided by the optical submarine cable system according to the present example embodiment described above.

While an example of a first target optical submarine apparatus matching a second target optical submarine apparatus has been described above, the apparatuses are not necessarily limited to the above. The optical submarine cable system according to the present example embodiment may include a first target optical submarine apparatus other than a second target optical submarine apparatus or may include a second target optical submarine apparatus other than a first target optical submarine apparatus.

Fourth Example Embodiment

In the optical submarine cable system according to the third example embodiment, the frequency band of each command signal and the frequency band of a response signal to each command signal traveling through the same optical fiber in the other direction are set in such a way as not to overlap each other. Therefore, there is an issue that the frequency band allocated to a command signal and the frequency band allocated to a response signal cannot be used for optical communication and channel capacity is accordingly reduced. The present example embodiment is an example embodiment related to an optical submarine cable system enabling the frequency band of each command signal and the frequency band of a response signal to each command signal in the other direction to be set in such a way as to overlap each other.

Configuration and Operation

A configuration example of an optical submarine cable system according to the present example embodiment is the optical submarine cable system 10 in FIG. 1. The optical submarine cable system 10 according to the present example embodiment differs from the optical submarine cable system 10 according to the third example embodiment in the following points. The difference between the optical submarine cable system 10 according to the present example embodiment and the optical submarine cable system 10 according to the third example embodiment will be mainly described below.

The frequency band of a first command signal transmitted by a terrestrial terminal apparatus 11 may overlap the frequency band of a second response signal transmitted by each of optical submarine apparatuses 21 to 2n. Further, the frequency band of a second command signal transmitted by a terrestrial terminal apparatus 12 may overlap the frequency band of a first response signal transmitted by each of the optical submarine apparatuses 21 to 2n.

Figure 9:
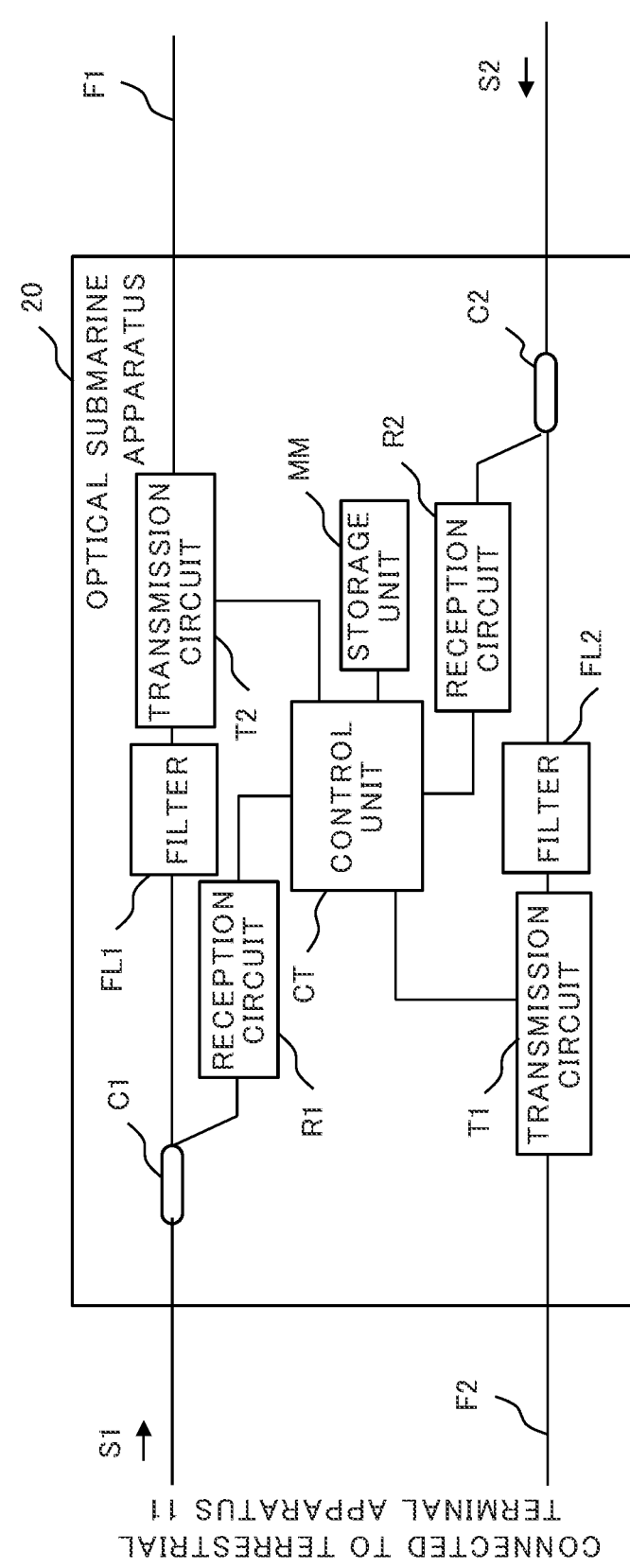
FIG. 9 is a conceptual diagram illustrating a configuration example of an optical submarine apparatus according to a fourth example embodiment.

FIG. 9 is a conceptual diagram illustrating a configuration example of an optical submarine apparatus 20 being an example of each of the optical submarine apparatuses 21 to 2n according to the present example embodiment. The optical submarine apparatus 20 in FIG. 9 includes filters FL1 and FL2 in addition to the configuration included in the optical submarine apparatus 20 in FIG. 8. The filter FL1 blocks light in the frequency band of a first command signal superposed on an optical signal S1. Therefore, a first command signal does not pass through the filter FL1. The filter FL2 blocks light in the frequency band of a second command signal superposed on an optical signal S2. Therefore, the second command signal does not pass through the filter FL2.

Operations performed by the optical submarine apparatus 20 in FIG. 9 differ from the operations performed by the optical submarine apparatus 20 in FIG. 8 in the following points. The difference between the operations performed by the optical submarine apparatus 20 in FIG. 9 and the operations performed by the optical submarine apparatus 20 in FIG. 8 will be mainly described below.

When a reception circuit R1 receives a first command signal, a control unit CT causes a storage unit MM to hold first command information related to the first command signal. When a reception circuit R2 receives a second command signal, the control unit CT causes the storage unit MM to hold second command information related to the second command signal.

The control unit CT successively determines whether first response permission information is 0. Then, when determining that the first response permission information is 0, the control unit CT makes a determination about whether the storage unit MM holds second command information. When determining that the storage unit MM holds second command information, the control unit CT causes a transmission circuit T1 to superpose a second command signal related to the second command information on the optical signal S2 and transmit the resulting signal to an optical fiber F2. When causing the transmission circuit T1 to transmit the second command signal, the control unit CT causes the storage unit MM to delete the second command information related to the second command signal. When the storage unit MM holds a plurality of pieces of second command information, the control unit CT causes the transmission circuit T1 to transmit a second command signal related to each piece of second command information held by the storage unit MM.

When there is no second command information held by the storage unit MM, the control unit CT makes a determination about whether the storage unit MM holds first response information. When determining that the storage unit MM holds first response information, the control unit CT causes the transmission circuit T1 to transmit a first response signal related to the first response information. When causing the transmission circuit T1 to transmit the first response signal, the control unit CT causes the storage unit MM to delete the first response information related to the first response signal. When the storage unit MM holds a plurality of pieces of first response information, the control unit CT causes the transmission circuit T1 to transmit a first response signal related to each piece of first response information held by the storage unit MM.

The control unit CT causes a transmission circuit T2 to perform transmission processing similar to the transmission processing performed on a second command signal and a first response signal by the transmission circuit T1 as described above on a first command signal and a second response signal.

Based on the above, the control unit CT avoids overlap between a time period in which a second command signal is superposed on a first signal and a time period in which a first response signal is superposed on the first signal and also avoids overlap between a time period in which a first command signal is superposed on a second signal and a time period in which a second response signal is superposed on the second signal. Therefore, the aforementioned operation of the control unit CT allows overlap between the frequency band of each command signal and the frequency band of a response signal to each command signal in the other direction.

Effect

The optical submarine apparatus according to the present example embodiment provides an effect of allowing overlap between the frequency band of each command signal and the frequency band of a response signal to each command signal in the other direction, in addition to the effects provided by the optical submarine apparatus according to the third example embodiment.

An example of using a transmission permission value composed of an integer equal to or greater than 0 as transmission permission information has been described in each example embodiment described above. However, the transmission permission information does not necessarily be a transmission permission value. The transmission permission information has only to be composed of information representing a stage of the information. For example, the transmission permission information may be a character, a number, or a symbol a rank of which is determined, or a combination of the above.

Figure 10:
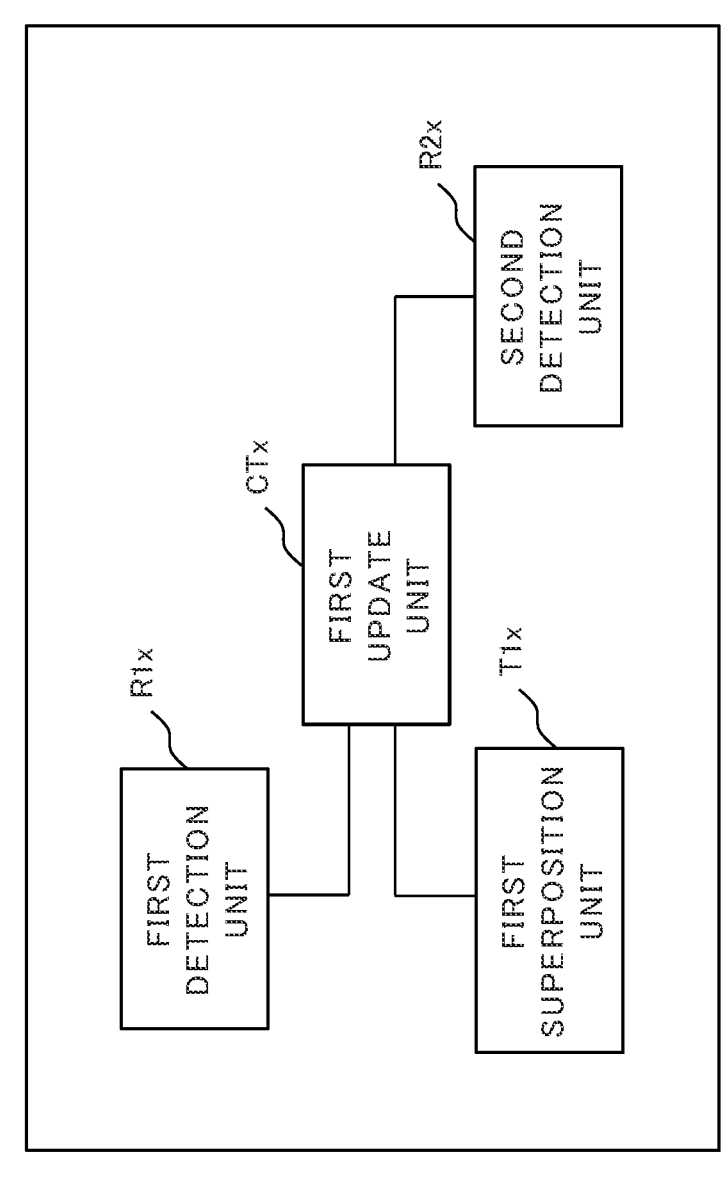
FIG. 10 is a conceptual diagram illustrating a minimum configuration of a transmission apparatus according to each example embodiment.

FIG. 10 is a conceptual diagram illustrating a configuration of a transmission apparatus $20x$ being a minimum configuration of an optical submarine apparatus according to each example embodiment. The transmission apparatus $20x$ includes a first detection unit $R1x$, a second detection unit $R2x$, a first superposition unit $T1x$, and a first update unit CTx.

The first detection unit $R1x$ detects a first command signal superposed on a first optical signal traveling through an optical submarine cable in a first direction. The second detection unit $R2x$ detects a first response signal being a response signal to the first command signal and being superposed by a first separate optical submarine apparatus on a second optical signal traveling through the optical submarine cable in a second direction. The first separate optical submarine apparatus is an optical submarine apparatus other than an own optical submarine apparatus being an optical submarine apparatus including the own transmission apparatus.

When a first stage being a stage of first transmission permission information is a first setting stage, the first superposition unit $T1x$ superposes a first response signal being a response signal to the first command signal the destination of which is the own optical submarine apparatus on the second optical signal. The first update unit CTx updates the first stage, based on a detection completion count of the first command signal the destination of which is the first separate optical submarine apparatus and a detection completion count of the first response signal.

With the aforementioned configuration, the transmission apparatus can prevent overlap between a period in which the first response signal from the separate optical submarine apparatus passes through the optical submarine cable and a period in which the first response signal transmitted by the own optical submarine apparatus passes through the optical submarine cable. Therefore, the transmission apparatus $20x$ can first equalize the frequency band of a response signal from the each optical submarine apparatus. Therefore, the transmission apparatus $20x$ can facilitate transmission timing control of a command signal and demodulation of a response signal at a terrestrial terminal apparatus and can secure a wider frequency band for communication.

Therefore, with the configuration, the transmission apparatus $20x$ provides the effect described in the Advantageous Effects of Invention section.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, the whole or part of the example embodiments disclosed above may also be described as, but not limited to, the following supplementary notes.

Supplementary Note 1

A transmission apparatus including:

a first detection unit detecting a first command signal superposed on a first optical signal traveling through an optical submarine cable in a first direction;

a second detection unit detecting a first response signal being a response signal to the first command signal and being superposed on a second optical signal traveling through the optical submarine cable in a second direction by a first separate optical submarine apparatus being an optical submarine apparatus other than an own optical submarine apparatus being an optical submarine apparatus including an own transmission apparatus;

a first superposition unit superposing, on the second optical signal, a first response signal being a response signal to the first command signal a destination of which is the own optical submarine apparatus, when a first stage being a stage of first transmission permission information is a first setting stage; and a first update unit updating the first stage, based on a detection completion count of the first command signal the destination of which is the first separate optical submarine apparatus and a detection completion count of the first response signal.

Supplementary Note 2

The transmission apparatus according to Supplementary Note 1, wherein the first update unit performs first increment-or-decrement by one stage on the first stage every time detection of the first command signal the destination of which is the first separate optical submarine apparatus is completed, and the first update unit performs increment-or-decrement by the one stage in a direction opposite to the first increment-or-decrement on the first stage every time detection of the first response signal is completed.

Supplementary Note 3

The transmission apparatus according to Supplementary Note 1 or 2, wherein the first update unit sets the first stage to the first setting stage when an amount of time elapsed from a time when most recent detection of the first command signal is completed exceeds a first threshold value.

Supplementary Note 4

The transmission apparatus according to any one of Supplementary Notes 1 to 3, wherein a frequency band of the first optical signal and a frequency band of the first command signal do not overlap each other, and a frequency band of the second optical signal and a frequency band of the first response signal do not overlap each other.

21
22

Supplementary Note 5

The transmission apparatus according to any one of Supplementary Notes 1 to 4, wherein the first separate optical submarine apparatus is an optical submarine apparatus positioned farther in a traveling direction of the first optical signal than the optical submarine apparatus.

Supplementary Note 6

The transmission apparatus according to any one of Supplementary Notes 1 to 5, wherein the first detection unit identifies whether a destination of the first command signal is the first separate optical submarine apparatus, based on an identifier of the first separate optical submarine apparatus included in the received first command signal.

Supplementary Note 7

The transmission apparatus according to any one of Supplementary Notes 1 to 6, further including:

a third detection unit detecting a second command signal superposed on the second optical signal;

a fourth detection unit detecting a second response signal being a response signal to the second command signal superposed on the second optical signal by a second separate optical submarine apparatus being an optical submarine apparatus other than the own optical submarine apparatus;

a second superposition unit superposing, on the first optical signal, a second response signal being a response signal to the second command signal the destination of which is the own optical submarine apparatus, when a second stage being a stage of second transmission permission information is a second setting stage; and a second update unit updating the second stage, based on a detection completion count of the second command signal the destination of which is the second separate optical submarine apparatus and a detection completion count of the second response signal.

Supplementary Note 8

The transmission apparatus according to Supplementary Note 7, wherein the second update unit performs first increment-or-decrement by one stage on the second stage every time detection of the second command signal the destination of which is the second separate optical submarine apparatus is completed, and the first update unit performs increment-or-decrement by the one stage on the second stage in a direction opposite to the first increment-or-decrement every time detection of the first response signal is completed.

Supplementary Note 9

The transmission apparatus according to Supplementary Note 7 or 8, wherein the second update unit sets the second stage to the second setting stage when an amount of time elapsed from a time when most recent detection of the second command signal is completed exceeds a second threshold value.

Supplementary Note 10

The transmission apparatus according to any one of Supplementary Notes 7 to 9, wherein a frequency band of the second optical signal and a frequency band of the second command signal do not overlap each other, and a frequency band of the first optical signal and a frequency band of the second response signal do not overlap each other.

Supplementary Note 11

The transmission apparatus according to any one of Supplementary Notes 7 to 10, wherein the second separate optical submarine apparatus is an optical submarine apparatus positioned farther in a traveling direction of the second optical signal than the optical submarine apparatus.

Supplementary Note 12

The transmission apparatus according to any one of Supplementary Notes 7 to 11, wherein the second detection unit identifies whether a destination of the second command signal is the second separate optical submarine apparatus, based on an identifier of the second separate optical submarine apparatus included in the received second command signal.

Supplementary Note 13

The transmission apparatus according to any one of Supplementary Notes 7 to 12, wherein a frequency band of the first command signal and a frequency band of the second response signal do not overlap each other, and a frequency band of the second command signal and a frequency band of the first response signal do not overlap each other.

Supplementary Note 14

The transmission apparatus according to any one of Supplementary Notes 7 to 13, wherein the first detection unit also serves as the fourth detection unit, and the second detection unit also serves as the third detection unit.

Supplementary Note 15

The transmission apparatus according to any one of Supplementary Notes 7 to 14, further including:

a first removal unit removing the first command signal from the first optical signal;

a second removal unit removing the second command signal from the second optical signal;

a third superposition unit superposing, on the first optical signal from which the first command signal is removed by the first removal unit, a command signal including command information included in the received first command signal, when a stage of the second transmission permission information is the second setting stage;

a fourth superposition unit superposing, on the second optical signal from which the second command signal is removed by the second removal unit, a command signal including command information included in the received second command signal, when a stage of the first transmission permission information is the first setting stage;

a first control unit performing control in such a way that a period in which a non-superposed first command signal being the first command signal not superposed on the first optical signal is superposed on the first optical signal and a period in which a non-superposed second response signal being the second response signal not superposed on the first optical signal is superposed on the first optical signal do not overlap each other; and a second control unit performing control in such a way that a period in which a non-superposed second command signal being the second command signal not superposed on the second optical signal is superposed on the second optical signal and a period in which a non-superposed first response signal being the first response signal not superposed on the second optical signal is superposed on the second optical signal do not overlap each other.

Supplementary Note 16

The transmission apparatus according to Supplementary Note 15, wherein, when the non-superposed first command signal is received and the non-superposed second response signal exists, control is performed in such a way that the non-superposed first command signal is superposed on the first optical signal before the non-superposed second response signal is superposed, and, when the non-superposed second command signal is received and the non-superposed first response signal exists, the second control unit performs control in such a way as to superpose the non-superposed second command signal on the second optical signal before superposing the non-superposed first response signal.

Supplementary Note 17

A transmission method including:

detecting a first command signal superposed on a first optical signal traveling through an optical submarine cable in a first direction;

detecting a first response signal being a response signal to the first command signal and being superposed on a second optical signal traveling through the optical submarine cable in a second direction by a first separate optical submarine apparatus being an optical submarine apparatus other than an own optical submarine apparatus;

superposing, on the second optical signal, a first response signal being a response signal to the first command signal a destination of which is the own optical submarine apparatus, when a first stage being a stage of first transmission permission information is a first setting stage; and updating the first stage, based on a detection completion count of the first command signal the destination of which is the first separate optical submarine apparatus and a detection completion count of the first response signal.

Supplementary Note 18

A transmission program causing a computer to execute:

processing of detecting a first command signal superposed on a first optical signal traveling through an optical submarine cable in a first direction;

processing of detecting a first response signal being a response signal to the first command signal and being superposed on a second optical signal traveling through the optical submarine cable in a second direction by a first separate optical submarine apparatus being an optical submarine apparatus other than an own optical submarine apparatus;

processing of superposing, on the second optical signal, a first response signal being a response signal to the first command signal a destination of which is the own optical submarine apparatus, when a first stage being a stage of first transmission permission information is a first setting stage; and processing of updating the first stage, based on a detection completion count of the first command signal the destination of which is the first separate optical submarine apparatus and a detection completion count of the first response signal.

For example, the "optical submarine cable" in the aforementioned supplementary notes is an optical submarine cable including the optical fibers F1 and F2 in FIG. 1.

For example, the "first optical signal" is the optical signal S1 in FIG. 1, FIG. 2, FIG. 8, and FIG. 9.

For example, the "first detection unit" is the reception circuit R1 in FIG. 2, FIG. 8, and FIG. 9, or a part detecting the first command signal in the first detection unit R1x in FIG. 10.

For example, the "second optical signal" is the optical signal S2 in FIG. 1, FIG. 2, FIG. 8, and FIG. 9.

For example, the "first separate optical submarine apparatus" is an optical submarine apparatus other than the own optical submarine apparatus out of the optical submarine apparatuses 21 to 2n in FIG. 1.

For example, the "second detection unit" is the reception circuit R2 in FIG. 2, FIG. 8, and FIG. 9, or a part detecting the first response signal in the second detection unit R2x in FIG. 10.

For example, the "first stage" is a stage represented by an integer equal to or greater than 0 constituting the aforementioned first transmission permission value.

For example, the "first setting stage" is a stage represented by the aforementioned first transmission permission value being 0.

For example, the "first superposition unit" is the transmission circuit T1 in FIG. 2, FIG. 8, and FIG. 9, or a part transmitting the first response information in the first superposition unit T1x in FIG. 10.

For example, the "first update unit" is a part performing the processing in FIG. 5 in the control unit CT in FIG. 2, FIG. 8, and FIG. 9, or the first update unit CTx in FIG. 10.

For example, the "transmission apparatus" is the optical submarine apparatus 20 in FIG. 2, FIG. 8, and FIG. 9, or the transmission apparatus 20x in FIG. 10.

For example, the "third detection unit" is a part receiving the second command signal in the reception circuit R2 in FIG. 8 and FIG. 9.

For example, the "fourth detection unit" is a part detecting the second response signal in the reception circuit R1 in FIG. 8 and FIG. 9.

For example, the "second superposition unit" is a part superposing the second response signal in the transmission circuit T2 in FIG. 8 and FIG. 9.

For example, the "second update unit" is a part updating the second transmission permission information in the control unit CT in FIG. 2, FIG. 8, and FIG. 9.

For example, the "second separate optical submarine apparatus" is an optical submarine apparatus other than the own optical submarine apparatus out of the optical submarine apparatuses 21 to 2n in FIG. 1 according to the third example embodiment or the fourth example embodiment.

For example, the "first removal unit" is the filter FL1 in FIG. 9.

For example, the "second removal unit" is the filter FL2 in FIG. 9.

For example, the "third superposition unit" is a part superposing the first command signal in the transmission circuit T2 in FIG. 8 and FIG. 9.

For example, the "fourth superposition unit" is a part superposing the second command signal in the transmission circuit T1 in FIG. 8 and FIG. 9.

For example, the "first control unit" is a part in the control unit CT in FIG. 8 performing control in such a way that a period in which the non-superposed first command signal is superposed on the first optical signal and a period in which the non-superposed second response signal is superposed on the first optical signal do not overlap each other.

For example, the "second control unit" is a part in the control unit CT in FIG. 8 performing control in such a way that a period in which a non-superposed second command signal is superposed on the second optical signal and a period in which the non-superposed first response signal is superposed on the second optical signal do not overlap each other.

For example, the "computer" is a computer included in the control unit CT in FIG. 2, FIG. 7, and FIG. 8 or included in the control unit CT in FIG. 2, FIG. 7, and FIG. 8.

For example, the "program" is a program causing the computer to execute processing and being held by the storage unit MM in FIG. 2, FIG. 7, and FIG. 8.

This application is based upon and claims the benefit of priority from Japanese patent application No. 2020-210946, filed on Dec. 21, 2020, the disclosure of which is incorporated herein in its entirety by reference.

REFERENCE SIGNS LIST

10 Optical submarine cable system
11, 12 Terrestrial terminal apparatus
21, 22, 2$n$ Optical submarine apparatus
20$x$ Transmission apparatus
C1, C2 Optical coupler
CT Control unit
CT$x$ First update unit
F1, F2 Optical fiber
FL1, FL2 Filter
MM Storage unit
R1, R2 Reception circuit
R1$x$ First detection unit
R2$x$ Second detection unit
S1, S2 Optical signal
T1, T2 Transmission circuit
T1$x$ First superposition unit
t1, t2, t3, t4, t5, t6, t7, t8, t9 Time
What is claimed is:

1. A transmission apparatus comprising:
a first detection circuit configured to detect a first command signal superposed on a first optical signal traveling through an optical submarine cable in a first direction;
a second detection circuit configured to detect a first response signal being a response signal to the first command signal and being superposed on a second optical signal traveling through the optical submarine cable in a second direction by a first separate optical submarine apparatus being an optical submarine apparatus other than an own optical submarine apparatus;
a first superposition circuit configured to superpose, on the second optical signal, a first response signal being a response signal to the first command signal a destination of which is the own optical submarine apparatus, when a first stage being a stage of first transmission permission information is a first setting stage; and
a first update circuit configured to update the first stage, based on a detection completion count of the first command signal the destination of which is the first separate optical submarine apparatus and a detection completion count of the first response signal.

2. The transmission apparatus according to claim 1, wherein the first update circuit performs first increment-or-decrement by one stage on the first stage every time detection of the first command signal the destination of which is the first separate optical submarine apparatus is completed, and
wherein the first update circuit performs increment-or-decrement by the one stage in a direction opposite to the first increment-or-decrement on the first stage every time detection of the first response signal is completed.

3. The transmission apparatus according to claim 1, wherein the first update circuit sets the first stage to the first setting stage when an amount of time elapsed from a time when most recent detection of the first command signal is completed exceeds a first threshold value.

4. The transmission apparatus according to claim 1, wherein a frequency band of the first optical signal and a frequency band of the first command signal do not overlap each other, and a frequency band of the second optical signal and a frequency band of the first response signal do not overlap each other.

5. The transmission apparatus according to claim 1, wherein the first separate optical submarine apparatus is an optical submarine apparatus positioned farther in a traveling direction of the first optical signal than the optical submarine apparatus.

6. The transmission apparatus according to claim 1, wherein the first detection circuit identifies whether a destination of the first command signal is the first separate optical submarine apparatus, based on an identifier of the first separate optical submarine apparatus included in the received first command signal.

7. The transmission apparatus according to claim 1, further comprising:
a third detection circuit configured to detect a second command signal superposed on the second optical signal;
a fourth detection circuit configured to detect a second response signal being a response signal to the second command signal superposed on the second optical signal by a second separate optical submarine apparatus being an optical submarine apparatus other than the own optical submarine apparatus;
a second superposition circuit configured to superpose, on the first optical signal, a second response signal being a response signal to the second command signal the destination of which is the own optical submarine apparatus, when a second stage being a stage of second transmission permission information is a second setting stage; and
a second update circuit configured to update the second stage, based on a detection completion count of the second command signal the destination of which is the second separate optical submarine apparatus and a detection completion count of the second response signal.

8. The transmission apparatus according to claim 7, wherein the second update circuit performs first increment-or-decrement by one stage on the second stage every time detection of the second command signal the destination of which is the second separate optical submarine apparatus is completed, and
wherein the first update circuit performs increment-or-decrement by the one stage on the second stage in a direction opposite to the first increment-or-decrement every time detection of the first response signal is completed.

9. The transmission apparatus according to claim 7, wherein the second update circuit sets the second stage to the second setting stage when an amount of time elapsed from a time when most recent detection of the second command signal is completed exceeds a second threshold value.

10. The transmission apparatus according to claim 7, wherein a frequency band of the second optical signal and a frequency band of the second command signal do not overlap each other, and a frequency band of the first optical signal and a frequency band of the second response signal do not overlap each other.

11. The transmission apparatus according to claim 7, wherein the second separate optical submarine apparatus is an optical submarine apparatus positioned farther in a traveling direction of the second optical signal than the optical submarine apparatus.

12. The transmission apparatus according to claim 7, wherein the second detection circuit identifies whether a destination of the second command signal is the second separate optical submarine apparatus, based on an identifier of the second separate optical submarine apparatus included in the received second command signal.

13. The transmission apparatus according to claim 7, wherein a frequency band of the first command signal and a frequency band of the second response signal do not overlap each other, and a frequency band of the second command signal and a frequency band of the first response signal do not overlap each other.

14. The transmission apparatus according to claim 7, wherein the first detection circuit also serves as the fourth detection circuit, and the second detection circuit also serves as the third detection circuit.

15. The transmission apparatus according to claim 14, further comprising:

a first removal circuit configured to remove the first command signal from the first optical signal;

a second removal circuit configured to remove the second command signal from the second optical signal;

a third superposition circuit configured to superpose, on the first optical signal from which the first command signal is removed by the first removal circuit, a command signal including command information included in the received first command signal, when a stage of the second transmission permission information is the second setting stage;

a fourth superposition circuit configured to superpose, on the second optical signal from which the second command signal is removed by the second removal circuit, a command signal including command information included in the received second command signal, when a stage of the first transmission permission information is the first setting stage;

a first control circuit configured to perform control in such a way that a period in which a non-superposed first command signal being the first command signal not superposed on the first optical signal is superposed on the first optical signal and a period in which a non-superposed second response signal being the second response signal not superposed on the first optical signal is superposed on the first optical signal do not overlap each other; and a second control circuit configured to perform control in such a way that a period in which a non-superposed second command signal being the second command signal not superposed on the second optical signal is superposed on the second optical signal and a period in which a non-superposed first response signal being the first response signal not superposed on the second optical signal is superposed on the second optical signal do not overlap each other.

16. The transmission apparatus according to claim 15, wherein:

when the non-superposed first command signal is received and the non-superposed second response signal exists, control is performed in such a way that the non-superposed first command signal is superposed on the first optical signal before the non-superposed second response signal is superposed, and when the non-superposed second command signal is received and the non-superposed first response signal exists, the second control circuit performs control in such a way as to superpose the non-superposed second command signal on the second optical signal before superposing the non-superposed first response signal.

17. A transmission method in an optical submarine apparatus included in an optical submarine cable system performing optical communication through an optical submarine cable, the transmission method comprising:

detecting a first command signal superposed on a first optical signal traveling through the optical submarine cable in a first direction;

detecting a first response signal being a response signal to the first command signal and being superposed on a second optical signal traveling through the optical submarine cable in a second direction by a first separate optical submarine apparatus being an optical submarine apparatus other than an own optical submarine apparatus;

superposing, on the second optical signal, a first response signal being a response signal to the first command signal a destination of which is the own optical submarine apparatus, when a first stage being a stage of first transmission permission information is a first setting stage; and updating the first stage, based on a detection completion count of the first command signal the destination of which is the first separate optical submarine apparatus and a detection completion count of the first response signal.

18. A tangible and non-transitory recording medium of a transmission program on which a program is recorded, the program causing a computer included in an optical submarine apparatus included in an optical submarine cable system performing optical communication through an optical submarine cable to execute:

processing comprising detecting a first command signal superposed on a first optical signal traveling through the optical submarine cable in a first direction;

processing comprising detecting a first response signal being a response signal to the first command signal and being superposed on a second optical signal traveling through the optical submarine cable in a second direction by a first separate optical submarine apparatus being an optical submarine apparatus other than an own optical submarine apparatus;

processing comprising superposing, on the second optical signal, a first response signal being a response signal to the first command signal a destination of which is the own optical submarine apparatus, when a first stage being a stage of first transmission permission information is a first setting stage; and processing comprising updating the first stage, based on a detection completion count of the first command signal the destination of which is the first separate optical submarine apparatus and a detection completion count of the first response signal.

* * * * *